(12) United States Patent
Benjamin et al.

(10) Patent No.: US 8,554,039 B2
(45) Date of Patent: Oct. 8, 2013

(54) BUFFERED LARGE CORE FIBER

(75) Inventors: Seldon David Benjamin, Painted Post, NY (US); Kevin Wallace Bennett, Hammondsport, NY (US); Gregory Blake Bohler, Lenoir, NC (US); Jeffrey Coon, Wilmington, NC (US); Samuel Don Navé, Newton, NC (US)

(73) Assignee: Corning Incorporated, Corning, NY (US)

(*) Notice: Subject to any disclaimer, the term of this patent is extended or adjusted under 35 U.S.C. 154(b) by 303 days.

(21) Appl. No.: 12/901,729

(22) Filed: Oct. 11, 2010

(65) Prior Publication Data

US 2011/0085772 A1    Apr. 14, 2011

Related U.S. Application Data

(60) Provisional application No. 61/299,397, filed on Jan. 29, 2010, provisional application No. 61/250,957, filed on Oct. 13, 2009.

(51) Int. Cl.
*G02B 6/132* (2006.01)

(52) U.S. Cl.
USPC ........................................... 385/128

(58) Field of Classification Search
USPC .......................... 385/128, 124, 145
See application file for complete search history.

(56) References Cited

U.S. PATENT DOCUMENTS

| | | | |
|---|---|---|---|
| 3,980,390 A | 9/1976 | Yamamoto et al. | 350/96 |
| 4,582,392 A | 4/1986 | Williams et al. | 350/96.2 |
| 5,233,677 A | 8/1993 | Winslow | 385/89 |
| 5,381,504 A * | 1/1995 | Novack et al. | 385/128 |
| 5,553,181 A | 9/1996 | van Woesik | 385/85 |
| 5,644,670 A * | 7/1997 | Fukuda et al. | 385/124 |
| 6,033,124 A | 3/2000 | Lesueur et al. | 385/53 |
| 6,174,091 B1 | 1/2001 | Herrmann | 385/81 |
| 6,249,631 B1 | 6/2001 | LeVey et al. | 385/134 |
| 6,379,055 B1 | 4/2002 | Uken | 385/75 |
| 6,443,628 B1 | 9/2002 | Horie et al. | 385/73 |
| 6,702,478 B2 | 3/2004 | Inagaki et al. | 385/72 |
| 7,241,056 B1 | 7/2007 | Kuffel et al. | 385/60 |
| 2002/0084301 A1 | 7/2002 | Murgatroyd | 225/105 |
| 2005/0286835 A1 | 12/2005 | Maxey | 385/55 |
| 2008/0304796 A1 | 12/2008 | Beshears et al. | 385/81 |
| 2009/0087148 A1 | 4/2009 | Bradley et al. | 385/76 |
| 2009/0103870 A1 | 4/2009 | Solomon et al. | 385/98 |
| 2009/0279837 A1 * | 11/2009 | Aoyagi et al. | 385/128 |

FOREIGN PATENT DOCUMENTS

| | | |
|---|---|---|
| EP | 0347118 | 3/1994 |
| EP | 2075605 | 7/2009 |
| JP | 4257803 | 9/1992 |
| JP | 9090183 | 4/1997 |
| JP | 2004/117794 | 4/2004 |

* cited by examiner

*Primary Examiner* — Eric Wong
(74) *Attorney, Agent, or Firm* — Svetlana Z. Short

(57) ABSTRACT

An optical fiber comprising: (i) a multi-mode silica based glass core, said core having a 80-300 μm diameter and an index of refraction $n_1$; (ii) a cladding surrounding the core, said cladding having a thickness ≤20 μm and index of refraction index of refraction $n_2 < n_1$, the cladding comprising (a) fluorine doped silica with relative index of refraction delta <0, or (b) a polymer with relative index of refraction delta <0; (iii) a protective coating, the protective coating having a Young's modulus greater than 700 MPa, a thickness ≤15 μm, and an index of refraction index of refraction $n_3 > n_2$; and (iv) a permanent buffer.

36 Claims, 1 Drawing Sheet

BUFFERED LARGE CORE FIBER

This application claims the benefit of priority under 35 USC 119(e) of U.S. Provisional Application Ser. No. 61/299,397 filed on Jan. 29, 2010 and U.S. Provisional Application Ser. No. 61/250,957 filed Oct. 13, 2009.

BACKGROUND

1. Field

The present invention relates generally to optical fibers which include a glass core, a plastic or glass cladding surrounding the core, and a thin protective coating surrounding the cladding, and a protective buffer.

2. Technical Background

Optical fibers with a glass core and glass cladding, a permanent protective coating and a strippable buffer coating are known. The buffer coating is typically includes an inner, soft, resilient layer and an outer, rigid layer. The soft, resilient layer provides the optical fiber element with protection against microbending losses, and the outer, rigid layer protects the underlying layers from abrasion and mechanical damage. When such an optical fiber is connectorized, the buffer layer is stripped from one end of the optical fiber to make it possible to insert the optical fiber correctly into the connector and adhere it thereto. During connectorization, the permanent protective coating remains present on the external surface of the optical fiber. When this method is used, the protective coating prevents the optical fiber from being damaged by the tool that is used for removing the buffer layer. However, the step of stripping of the buffer layer adds expense and complexity to the connectorization process. Furthermore, some of the buffer coating may be left in place after the mechanical stripping step, resulting in noncircular/non uniform outer diameter.

If such a fiber is cut or cleaved without removal of the buffer layers, the force of the fiber or the cleaving tool pushes the fiber to move at least partially through the soft layer, so that the fiber is not concentric with the coatings, making it difficult to connect this fiber to another fiber without incurring large insertion loss.

Known optical fibers also include an optical fiber core, a silica cladding surrounding the optical fiber core and a permanent polymeric coating. The coated optical fiber has a small outer diameter of about 125-130, and does not include a strippable buffer layer. However, a fiber with such a small outer diameter may be difficult to handle and typically requires additional protection for use in typical applications.

SUMMARY

According to one embodiment of the invention an optical fiber comprises:
 (i) a multi-mode silica based glass core, said core having a 80-300 µm diameter and an index of refraction $n_1$;
 (ii) a cladding surrounding said core, said cladding having a thickness ≤20 µm and index of refraction index of refraction $n_2 < n_1$, said cladding comprising (a) fluorine doped silica with a relative index of refraction delta <0; or (b) a polymer with relative index of refraction delta <0;
 (iii) a protective coating, said protective coating having a Young's modulus greater than 700 MPa, a thickness ≤20 µm, and an index of refraction index of refraction $n_3 > n_2$; and
 (iv) a permanent buffer coating.

Preferably, the glass core is a graded index core and has a 175 µm-225 µm diameter; the cladding is a fluorinated polymer and has a thickness of 10 µm to 15 µm, the protective coating having the a thickness of ≤15 µm and preferably ≤10 µm; and the buffer coating has a shore D hardness of at least 60.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

One advantage of the optical fiber according to the present invention is that it has a buffer coating need not be stripped when such a fiber is used in a connector. Another advantage of the optical fiber according to the present invention is that the protective coating minimizes the fiber movement inside the buffer during cleaving and also during subsequent use in connectors, due to strong adhesion of the protective coating to both the cladding and the buffer coating. Yet another advantage of the optical fiber according to the present invention is that the protective coating prevents the optical fiber core from moving off-center during cleaving, thus minimizing coupling losses when this fiber is coupled to another fiber. Yet another advantage of the optical fiber according to the present invention is that the protective coating also provides protection during handling and storage if the final permanent buffer is not applied at the same time as the protective coating.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
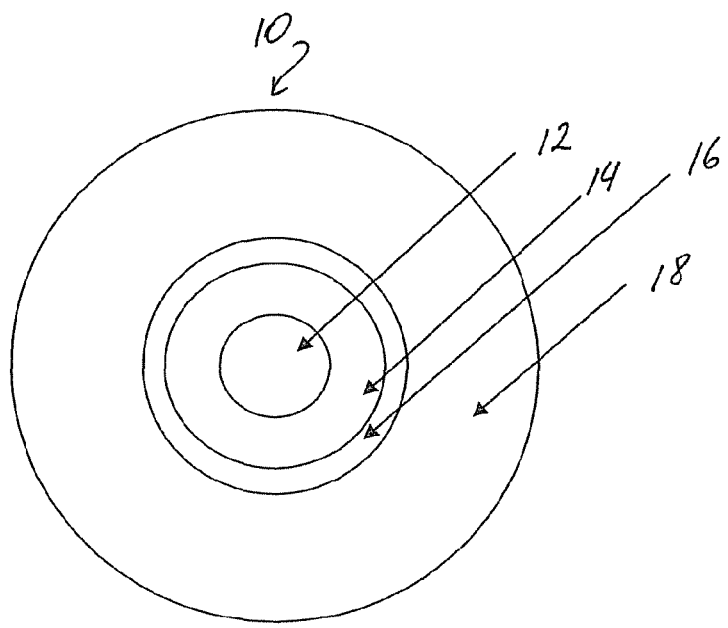
FIG. 1 is a schematic view of an optical fiber cross-section according to of one embodiment of the present invention.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" is defined as $\Delta\% = 100 \times (n_i^2 - n_c^2)/2n_i^2$, where $n_i$ is the maximum refractive index in region i, unless otherwise specified, and $n_c$ is refractive index of silica. As used herein, the relative refractive index is represented by $\Delta$ and its values are given in units of "%", unless otherwise specified. In cases where the refractive index of a region is less than that of silica, the relative index percent is negative and is referred to as having a depressed region or depressed index, and the minimum relative refractive index is calculated at the point at which the relative index is most negative unless otherwise specified. In cases where the refractive index of a region is greater than that of silica, the relative index percent is positive and the region can be said to be raised or to have a positive index. An "updopant" is herein considered to be a dopant which has a propensity to raise the refractive index relative to pure undoped $SiO_2$. A "down-dopant" is herein considered to be a dopant which has a propensity to lower the refractive index relative to pure undoped $SiO_2$.

The term "α-profile" or "alpha profile" refers to a relative refractive index profile, expressed in terms of $\Delta(r)$ which is in units of "%", where r is radius, which follows the equation, $\Delta(r)=\Delta(r_o)(1-[|r-r_o|/(r_1-r_o)]\alpha)$, where $r_0$ is the point at which $\Delta(r)$ is maximum, 1 is the point at which $\Delta(r)$ % is zero, and r is in the range r; $<r<r_f$, where $\Delta$ is defined above, is the initial point of the α-profile, $r_f$ is the final point of the Δ-profile, and α is an exponent which is a real number.

Reference will now be made in detail to the present preferred embodiment of the invention, an example of which is illustrated in the accompanying drawings. Whenever possible, the same reference numerals will be used throughout the drawings to refer to the same or like parts. One embodiment of the optical fiber of the present invention is shown in FIG. 1, and is designated generally throughout by the reference numeral 10.

As embodied herein and depicted in FIG. 1, the exemplary optical fiber comprises: (i) a multi-mode silica based glass core 12; (ii) a cladding 14 surrounding the core 12; (iii) a thin protective coating 16, and (iv) a buffer coating 18 (also referred to as buffer herein) surrounding the protective coating 16.

Figure 2:
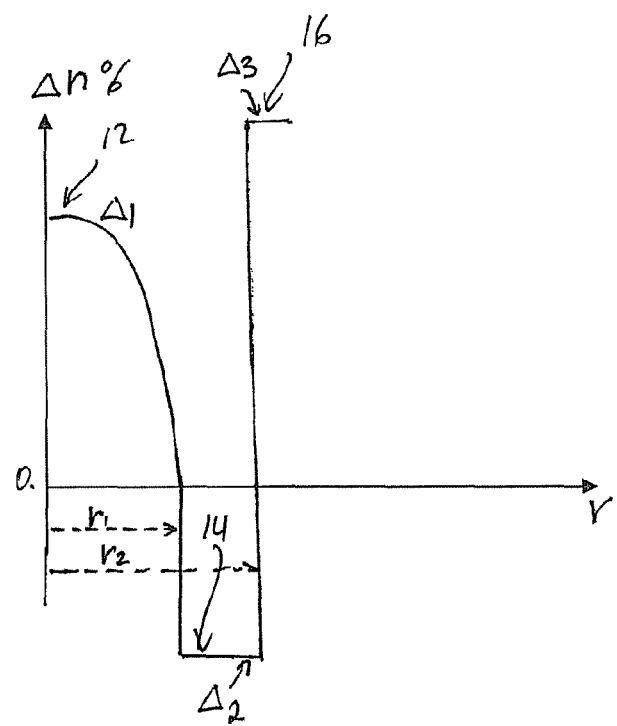
FIG. 2 is a plot of a refractive index profile of the optical fiber of FIG. 1.

The glass core 12 has an outer diameter of 80 μm to 300 μm diameter and an index of refraction $n_1$. Preferably, the glass core 12 comprises only passive materials. That is, the core 12 contains no active dopants—i.e., no gain producing dopants, such as Er, or Yb. Preferably, the core 12 includes more than 5 wt % of Ge. Preferably, in some embodiments the outer diameter of the glass core is 100 to 210 μm. As shown in FIG. 2, the relative refractive index of the core (relative to pure silica) is positive (i.e., ($\Delta_1$%>0). For example, $\Delta_1$ may be 1 to 2.5%. The cladding is relatively thin, and has thickness of preferably no more than 20 μm, and index of refraction index of refraction $n_2<n_1$. More preferably, the cladding thickness (width) is less than 16 μm, for example, 8 μm to 15 μm. Preferably the cladding 14 comprises a fluorinated polymer, with a negative relative refractive index delta ($\Delta_2$%), relative to that of pure silica. Alternatively, cladding 14 may be a fluorine doped silica with index of refraction with a negative relative refractive index delta, relative to that of pure silica (i.e., $\Delta_2$%<0). Preferably, cladding 14 preferably has a secant modulus at 2.5% strain of greater than 350 MPa. Preferably, the protective coating 16 has a Young's modulus greater than 700 MPa (e.g, 700-850 MPa), a thickness ≤20 μm (for example ≤15 μm), and an index of refraction index of refraction $n_3>n_2$. More preferably, the protective coating 16 has a Young's modulus greater than 850 MPa and thickness 15 μm or less, for example 6 μm-12 μm, or 6 μm-10 μm. Preferably, the shore D hardness of the protective coating 16 is greater than 55 (preferably 70 or greater).

For example, the glass core may be a graded index core with a 175 μm to 225 μm diameter; the cladding may be a fluorinated polymer with a thickness of 10 μm to 15 μm; the protective coating may have a thickness of 7 μm to 10 μm; and the buffer coating 18 preferably has at least an outer layer with a shore D hardness of at least 60. Preferably there is no soft coating (with a Young's modulus of less than 1 MPa) situated between the protective coating 16 and the cladding 14. Preferably the protective coating 16 is situated in contact with the cladding 14. The outer diameter of the cladding 14 may be, greater than 200 μm, for example 210 μm to 250 μm. The outer diameter of the protective coating 16 may be, for example 230 μm to 260 μm.

Preferably the shore D hardness each of the cladding 14, the protective layer 16, and the buffer coating is greater than 55, more preferably greater than 58. For example the cladding 14 may have a shore D hardness of about 75 (e.g., 72-78), the protective layer may have a shore D hardness of about 80 (e.g., 77 to 83), and the buffer coating (buffer) may have has a shore D hardness of about 60 (e.g., 58-63). Preferably, the shore D hardness of the protective coating is similar to Shore D hardness of the cladding (e.g., the shore D hardness of the protective 16 is preferably similar to that of the polymer cladding 14 (within +/−20, more preferably +/−15, even more preferably +/−10, for example within +/−5). The core 12 ends and the cladding 14 starts where the relative refractive index first reaches 0% (going outward radially) at a radius r1, and cladding 14 is defined to end at a radius r2 where the relative refractive index $\Delta 2(r)$ first reaches 0% (after $\Delta 2(r)$ has dipped to its minimum value), going outward radially. The protective coating 16 begins at radius r2 and ends at radius r3 defined at the interface between the protective coating and the permanent buffer layer.

The thin protective coating 16 supports and protects the fiber during the cutting or cleaving process. It is noted that the outer surface of the cladding 14 may be relatively slippery, allowing the fiber to move around within the buffer during cutting or cleaving if the fiber has no intermediate protective coating 16. The protective coating 16 has a strong adhesion to the cladding 14 and to the buffer 18, preventing such movement. Preferably the adhesion between the protective layer and the buffer is such that a pull force of greater than 3 N, for example greater than 3.5 N, and preferably greater than 4.4 N is required to strip 15 mm +/−1.5 mm of buffer from the protective coating. Preferably the buffer is permanent (i.e., it does not need to be stripped prior to cleaving and/or connectorization.) The protective coating 16 also helps to minimize and/or prevents the fiber core moving off-center during the cutting or cleaving operation, and thus enables better concentricity. For example, the concentricity (core center to buffer center, after cutting or cleaving is better than 20 μm, and according to some embodiments better then 10 μm, preferably better than 5 μm. Preferably the buffer coating does not have an inner, soft layer, so that during cleaving or cutting the fiber remains substantially in place relative to the center of the buffer (i.e, stays substantially concentric with the buffer). Preferably the buffer 18 is a single layer, relatively rigid coating. Applicants discovered that when the buffer includes a inner soft layer (e.g., a layer with Young's Modulus of less than 25 MPa), the process of cutting or cleaving the optical fiber may push the optical fiber through the soft layer, so that it is no longer substantially concentric with the buffer.

It is noted that, according to some embodiments, the buffered optical fiber has an outer diameter of greater than 500 μm, more preferably at least 750 μm, and even more preferably at least 1 mm (for example, between 1 and 2 mm). It is preferable that the buffer 18 remains during splicing, and will not be stripped. Also, preferably, the buffer 16 forms a permanent coating over the protective coating.

Some exemplary fibers 10 have a gradient index core 12, and may have alpha values between 1.8 and 2.2. Alternatively, the core 12 may have a step-index profile. Some exemplary fibers 10 have numerical apertures (NAs) between 0.28 and 0.53, for example 0.3 to 0.5. Typical numerical apertures of the embodiments of the optical fibers 10 may be, for example 0.35, 0.4, 0.43, or 0.45. For an optical fiber, the NA (Numerical Aperture) historically is defined as the sine of half the maximum angle of acceptance. For a multimode fiber, only meridional rays leading to guided core modes are considered. In the case of graded index multimode fibers, core refractive index depends on the core profile: the largest acceptance angle is measured at the core center. Accordingly, the core center's index can be used to calculate the NA (Numerical Aperture).

EXAMPLES

The invention will be further clarified by the following example.

Example 1

This exemplary optical fiber comprises: (i) a multi-mode silica based glass core 12; (ii) a cladding 14 surrounding the core 12; (iii) a thin protective coating 16, and (iv) a buffer coating 18 surrounding the protective coating 16. The glass core 12 has an outer diameter 200 µm diameter and an index of refraction $n_1$. It is made of silica glass doped with germanium such that the peak of the graded refractive index of the core (relative to pure silica) is $\Delta_1$=1.7%. The cladding thickness is 15 µm. The outer diameter of the cladding 14 in this exemplary fiber is 230 µm. The cladding 14 is made of fluorinated polymer, with a relative refractive index delta $\Delta_2$=−3.4% (relative to pure silica). This, the absolute relative refractive index difference between the core and the cladding of this exemplary fiber is 5.1%. The numerical aperture of this exemplary fiber is about 0.46. In this embodiment cladding 14 has the secant modulus at 2.5% strain of 412 MPa. Preferably, the shore D hardness of this cladding 14 and that of the protective coating 16 are similar and are higher than that of the permanent buffer, for example 75 and 80 respectively. The protective coating 16 of this embodiment has a Young's Modulus of about 700 MPa, a thickness ≤7.5 µm, an outer diameter of 245 µm, and an index of refraction index of refraction $n_3$>2% (relative to pure silica), and adhesion between the protective layer and the buffer such that a pull force of grater than 4.4 N (1.0 lbf) is required to strip 15 mm+/−1.5 mm of buffer from the protective coating. More specifically, in this embodiment, $n_3$=2.5%. The fluorinated plastic cladding used in this embodiment was PC-404f as marketed by SSCP CO., LTD. It was coated on the fiber and subsequently cured through irradiation with UV light. For example, in this embodiment, the protective coating 16 is acrylate resin. This protective coating was coated on the fiber and subsequently cured through irradiation with UV light. The protective coating 16 thus applied had a thickness of about 15 µm and Young's modulus ranging from 700 MPa to 850 MPa. The protective coating 16 of this exemplary fiber 10 is enclosed in a buffer tube 18. The buffer coating 18 is a PVC buffer and has an outer diameter of 1.5 mm. It does not include a soft inner layer. The protective coating 16 is thin and has a strong adhesion both to the fluorinated polymer cladding 14 and to the buffer 18, minimizing or eliminating fiber movement during the cleaving step. The buffer material has a shore D hardness of 60 or more. After the cleaving step, the concentricity (core center to buffer center), was better than 20 µm.

This fiber can be made, for example, by heating a glass preform and subsequently drawing a glass core having a diameter of 200 µm, double coating it with the fluorinated coating (corresponding to the cladding, such that NA-value is 0.46) and a second (protective) coating 16). In this embodiment, the first, cladding layer coating has a thickness of about 15 µm and the second, protective layer, had a thickness of about 7.5 µm with an E-modulus ranging from 25 to 1500 MPa (and preferably 700-1000 MPa), and the overall external diameter of the optical fiber is about 245 µm.

The optical fibers described herein may be prepared for connection with an another optical component or module by cutting or cleaving the optical fiber to produce a cleaved or a cut fiber, wherein the buffer remains on the fiber during cutting or cleaving. Thus, the cleaved or cut fiber can be inserted into a connector without stripping the buffer. Accordingly, according to one embodiment, the method of connecting such a cut or cleaved fiber according includes the step of placing the cut or cleaved fiber (with the buffer remaining thereon) into an optical connector; placing anther fiber in the connector, wherein the cut or cleaved fiber is optically coupled to the other fiber. The method of connecting such a cut or cleaved fiber with another fiber preferably includes the step of placing a quantity of gel between the fibers. According to one embodiment the the fibers are not attached to one another by an adhesive.

The fibers containing a buffer may be cut with a razor blade while the buffer remains on the fiber during the cutting. When the fibers according to the embodiments herein are cut with the razor blade, the cracks formed by cutting on the cut face of the fiber propagate from the cut facet (or the resulting end surface) by a distance d that is less than fiber diameter D. Preferably, according to some embodiments, d<0.5 D.

After the cutting or cutting step, the cut face of the fiber has a peak to valley (P-V) flatness of less than 200 µm, preferably less than 50 µm. If cleaved, the fiber may be cleaved with a diamond blade and according to some embodiments cleaved fiber preferably has hackle of less than 20% of area of endface, more preferably less than 5%.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber comprising:
   (i) a multi-mode silica based glass core, said core having a 80-300 µm diameter and an index of refraction $n_1$;
   (ii) a cladding surrounding said core, said cladding having a thickness ≤20 µm and index of refraction index of refraction $n_2$<$n_1$;
   (iii) a protective coating, said protective coating having a Young's modulus greater than 700 MPa, a thickness ≤20 µm, and an index of refraction index of refraction $n_3$>$n_2$; and
   (iv) a buffer, surrounding the protective coating, wherein the adhesion between the buffer and the protective layer is sufficiently strong, such that a pull force of greater than 3.5 N is required to strip 15 mm+/−1.5 mm of buffer from the protective coating.

2. The optical fiber of claim 1 wherein said cladding comprises: (a) fluorine doped silica with relative index of refraction delta <0, or (b) a polymer with relative index of refraction delta <0.

3. The optical fiber of claim 1 wherein said buffer has at least one layer with a shore D hardness >60.

4. The optical fiber of claim 1 wherein:
   (i) said glass core is a graded index core and has a 175-225 µm diameter, (ii) said cladding is a fluorinated polymer and has a thickness of 10 to 15 μm with a has a secant modulus at 2.5% strain of more than 350 MPa;
(iii) said protective coating having the a thickness of ≤10 μm;
(iv) said buffer coating having a shore D hardness of at least 60.

5. The optical fiber of claim 1 wherein the adhesion between the buffer and the protective layer is sufficiently strong, such that a pull force of greater than 4.4 N (1.0 lbf) is required to strip 15 mm+/−1.5 mm of buffer from the protective coating.

6. The optical fiber of claim 3 wherein the adhesion between the buffer and the protective layer is sufficiently strong such that a pull force of greater than 13.3 N (3.0 lbf) is required to strip 15 mm+/−1.5 mm of buffer from the protective coating.

7. The optical fiber of claim 1 wherein said buffer forms a permanent coating over said protective coating.

8. The optical fiber of claim 1, wherein said protective coating has an outer diameter of at least 500 μm.

9. The optical fiber of claim 7, wherein said buffer has an outer diameter of at least 750 μm.

10. The optical fiber of claim 9, wherein said buffer has an outer diameter of at least 1 mm.

11. The optical fiber of claim 7, wherein said buffer has an outer diameter of at least 500 μm.

12. An optical fiber comprising:
(i) a multi-mode silica based glass core, said core having a 80-300 μm diameter and an index of refraction $n_1$;
(ii) a cladding surrounding said core, said cladding having a thickness ≤20 μm and index of refraction index of refraction $n_2 < n_1$;
(iii) a protective coating, said protective coating having a Young's modulus greater than 700 MPa, a thickness ≤15 μm, and an index of refraction index of refraction $n_3 > n_2$; and
(iv) a buffer, surrounding the protective coating, wherein said buffer does not include an inner layer with a Young's modulus of less than 25 MPa.

13. The optical fiber of claim 12, wherein there is no coating with a Young's modulus below 20 MPa between the cladding and the buffer.

14. An optical fiber comprising:
(i) a multi-mode silica based glass core, said core having a 80-300 μm diameter and an index of refraction $n_1$;
(ii) a cladding surrounding said core, said cladding having a thickness ≤20 μm and index of refraction index of refraction $n_2 < n_1$;
(iii) a protective coating, said protective coating having a Young's modulus greater than 700 MPa, a thickness ≤15 μm, and an index of refraction index of refraction $n_3 > n_2$; and
(iv) a buffer, surrounding the protective coating, wherein said buffer is a single layer coating or a tube and has a shore D hardness of at least 60.

15. The optical fiber of claim 1, wherein said protective coating is situated between said cladding and said buffer and has a shore D hardness of at least 60.

16. An optical fiber comprising:
(i) a multi-mode silica based glass core, said core having a 80-300 μm diameter and an index of refraction $n_1$;
(ii) a cladding surrounding said core, said cladding having a thickness ≤20 μm and index of refraction index of refraction $n_2 < n_1$;
(iii) a protective coating, said protective coating having a Young's modulus greater than 700 MPa, a thickness ≤15 μm, and an index of refraction index of refraction $n_3 > n_2$; and
(iv) a buffer, surrounding the protective coating,
said cladding comprises (a) fluorine doped silica with relative index of refraction delta <0, or (b) a polymer with relative index of refraction delta <0; and
said protective coating has a Shore D hardness and the shore D hardness of said protective coating is within +/−20 of the Shore D hardness of said cladding; and said buffer is a permanent buffer.

17. The optical fiber of claim 16, said cladding is a polymer cladding and the shore D hardness of said protective coating is within +/−10 of the to Shore D hardness of said cladding.

18. The optical fiber of claim 16, wherein the shore D hardness of said protective coating is within +/−5 of the to Shore D hardness of said polymer cladding.

19. The optical fiber of claim 16, wherein the shore D hardness each of said cladding, said protective coating, and said buffer is greater than 55.

20. The optical fiber of claim 16, wherein the shore D hardness each of said protective coating is greater than that of the buffer.

21. An optical fiber comprising:
(i) a multi-mode silica based glass core, said core having a 80-300 μm diameter and an index of refraction $n_1$;
(ii) a cladding surrounding said core, said cladding having a thickness ≤20 μm and index of refraction index of refraction $n_2 < n_1$;
(iii) a protective coating, said protective coating having a Young's modulus greater than 700 MPa, a thickness ≤15 μm, and an index of refraction index of refraction $n_3 > n_2$; and
(iv) a buffer, surrounding the protective coating,
wherein the shore D hardness each of said cladding, said protective coating, and said buffer is greater than 55.

22. The optical fiber of claim 21, wherein said cladding has a shore D hardness of about 75, said protective coating has a shore D hardness of about 80, and said buffer has a shore D hardness of about 60.

23. An optical fiber according to claim 16, wherein the adhesion between the buffer and the protective layer is sufficiently strong, such that a pull force of greater than 4.4 N (1.0 lbf) is required to strip 15 mm+/−1.5 mm of buffer from the protective coating.

24. The optical fiber of claim 23 wherein: (i) the shore D hardness each of said cladding, said protective layer, and said buffer is greater than 55; and (ii) said buffer coating does not include an inner, soft layer with a Young's modules of less than 25 MPa.

25. The optical fiber of claim 23 wherein:
(i) said glass core is a graded index core and has a 175-225 μm diameter,
(ii) said cladding is a fluorinated polymer and has a thickness of 10 to 15 μm with a secant modulus at 2.5% strain of more than 350 MPa;
(iii) said protective coating having the a thickness of ≤10 μ.

26. A method of preparing optical fiber of claim 1, comprising:
cutting or cleaving the optical fiber of claim 1 to produce a cleaved or a cut fiber, wherein said buffer remains on the fiber during cutting or cleaving.

27. The method according to claim 26, wherein after said cutting or cutting step, the cut face of the fiber has a flatness of 200 μm, preferably less than 50 μm.

28. A method according to claim 26, wherein said fiber is cleaved with a diamond blade and cleaved fiber end face has hackle of less than 20%.

29. The method according to claim 26, wherein after said cutting step or cleaving the cut or cleaved fiber end face has % hackle of less than 5%.

30. The method according to claim 26, further comprising inserting said cleaved or cut fiber in a connector without stripping said buffer.

31. The method according to claim 29, wherein said method includes at least one of the following: no polishing of fiber end surface, no stripping of any coatings; no curing of adhesive(s).

32. The of method according to claim 29, wherein said method includes placing said cut or cleaved fiber into an optical connector; placing another fiber in said connector, wherein said cut or cleaved fiber is optically coupled to said another fiber.

33. The method according to claim 29, including placing a quantity of gel between said fibers.

34. The method according to claim 32, wherein said fibers are not attached to one another by an adhesive.

35. A method of preparing optical fiber of claim 1, said method comprising:
cutting an optical fiber containing a buffer with a razor blade while said buffer remains on the fiber during said cutting, while cracks from the cut facet propagate from the cut facet by a distance d that is less than fiber diameter D.

36. A method of preparing optical fiber of claim 35, wherein d<0.5 D.

* * * * *